(12) United States Patent
Satran et al.

(10) Patent No.: US 7,097,393 B2
(45) Date of Patent: Aug. 29, 2006

(54) TANGENTIAL CUTTING INSERT AND MILLING CUTTER

(75) Inventors: Amir Satran, Kfar Vradim (IL); Yaron Eisen, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 204 days.

(21) Appl. No.: 10/814,278

(22) Filed: Apr. 1, 2004

(65) Prior Publication Data
US 2004/0202515 A1 Oct. 14, 2004

(30) Foreign Application Priority Data
Apr. 8, 2003 (IL) .................................. 155288

(51) Int. Cl.
B23B 27/16 (2006.01)
(52) U.S. Cl. .................... 407/113; 407/116; 407/67
(58) Field of Classification Search ............. 407/113, 407/103, 67, 70, 35, 116, 115
See application file for complete search history.

(56) References Cited

U.S. PATENT DOCUMENTS

| | | | |
|---|---|---|---|
| 3,762,005 A * | 10/1973 | Erkfritz | 407/113 |
| 4,529,338 A * | 7/1985 | Erkfritz | 407/35 |
| 5,209,611 A | 5/1993 | Drescher | |
| 5,820,308 A * | 10/1998 | Hoefler | 407/40 |
| 5,839,856 A * | 11/1998 | Hintze et al. | 407/114 |
| 5,924,824 A * | 7/1999 | Satran et al. | 407/34 |
| 6,120,219 A * | 9/2000 | Satran et al. | 407/113 |
| 6,238,146 B1 * | 5/2001 | Satran et al. | 407/113 |
| 6,273,651 B1 | 8/2001 | Markus | |

FOREIGN PATENT DOCUMENTS

EP 0505 574 9/1992

* cited by examiner

Primary Examiner—Willmon Fridie, Jr.
(74) Attorney, Agent, or Firm—Womble Carlyle

(57) ABSTRACT

A tangential cutting insert having first and second opposing end surfaces and a peripheral side surface extending therebetween. First and second edges are formed at the intersection of the first and second end surfaces with the peripheral side surface. A groove in the peripheral side surface extends between and intersects the first and second end surfaces at first and second minor edges. In first and second opposing side views of the cutting insert, at least the first edge is generally concave.

15 Claims, 9 Drawing Sheets

US 7,097,393 B2

TANGENTIAL CUTTING INSERT AND MILLING CUTTER

FIELD OF THE INVENTION

The present invention relates in general to a tangential cutting insert and a milling cutter for metal cutting operations for milling complex profiles such as for milling crankshafts with an annular internal-milling cutter.

BACKGROUND OF THE INVENTION

Such milling cutters typically comprise an annular cutter body having a plurality of identical segments equally spaced about the inner circumference of the cutter body. Each segment having typically three or more cutting inserts secured to it, with each cutting insert intended to mill a particular feature of the complex profile. Inevitably, at least one of the cutting inserts of each segment has a different geometry from the other cutting inserts of that segment. Consequently, a stock of at least two types of cutting inserts has to be kept and care has to be taken when replacing a worn cutting insert of a segment not to replace it by a cutting insert of a different geometry.

In many such milling cutters, tangential cutting inserts are used. Tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert.

SUMMARY OF THE INVENTION

In accordance with the present invention there is provided a tangential cutting insert comprising:
- first and second opposing end surfaces and a peripheral side surface extending therebetween;
- first and second peripheral edges, respectively, formed at the intersection of the first and second end surfaces with the peripheral side surface, at least a section of the first peripheral edge forming a major cutting edge;
- at least one groove in the peripheral side surface extending between and intersecting the first and second end surfaces at said first and second peripheral edges, respectively;
- wherein, in first and second opposing side views of the cutting insert, at least the first peripheral edge is generally concave; and
- wherein, in an end view of the cutting insert, the major cutting edge comprises two straight line portions interrupted by the at least one groove.

In accordance with the present invention, in the first and second opposing side views the first peripheral edge extends between first and second end points thereof, the second end point being closer to a median plane of the cutting insert than the first end point.

Further in accordance with the present invention, in the first side view a minimum point exists on the first peripheral edge, the minimum point being closer to the median plane of the cutting insert than any other point on the at least the first peripheral edge and also being closer to one end point than the other.

Preferably, the cutting insert is provided with a through bore passing through the peripheral side surface.

Further typically, the through bore has an axis contained in the median plane of the cutting insert.

There is also provided in accordance with the present invention, a milling cutter comprising an annular cutter body having a plurality of identical segments equally spaced about an inner circumference of the cutter body, each segment having seven cutting inserts in accordance with the present invention secured thereto.

Preferably, the seven cutting inserts on each segment are arranged as three pairs and a single unpaired cutting insert.

Further preferably, in a first of the three pairs the cutting inserts are located on opposing side faces of the segment; in a second of the three pairs the cutting inserts are located on the inner face of the segment with one of the cutting inserts adjacent one side face of the segment and the other cutting insert adjacent the opposing side face of the segment; in a third of the three pairs, the cutting inserts are located adjacent a median plane of the segment on either side thereof; and the single unpaired cutting insert is located substantially midway between the two side faces of the segment.

In accordance with the present invention, the single unpaired cutting insert is secured to the segment with its groove facing away from the segment, whereas each of the cutting inserts of the three pairs of cutting inserts is secured to the segment with its groove facing towards the segment.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 1:
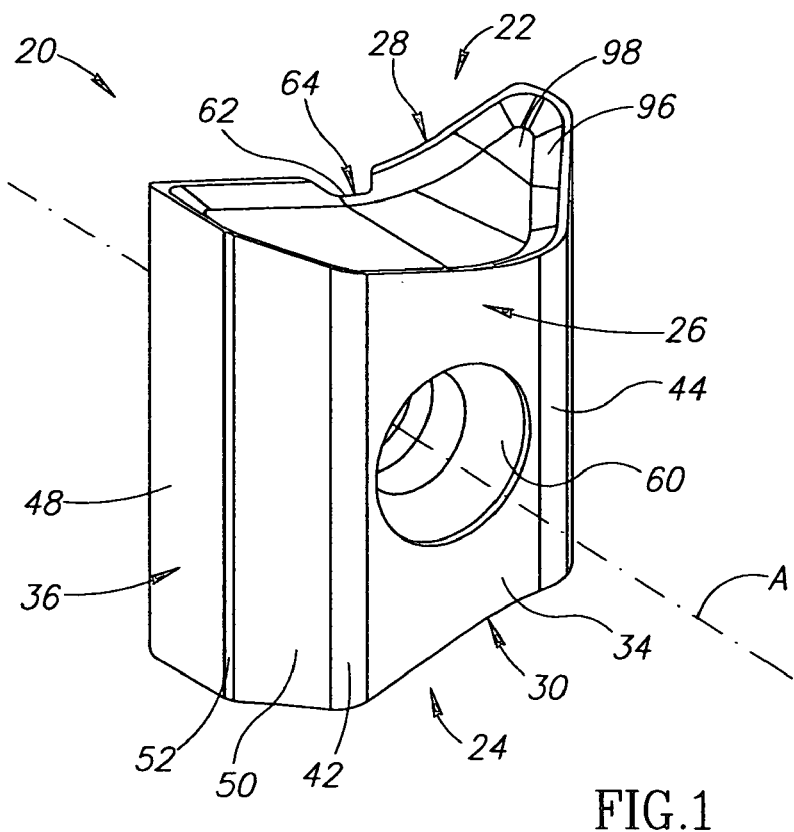
FIG. 1 is a perspective view of a cutting insert according to the present invention.
Figure 2:
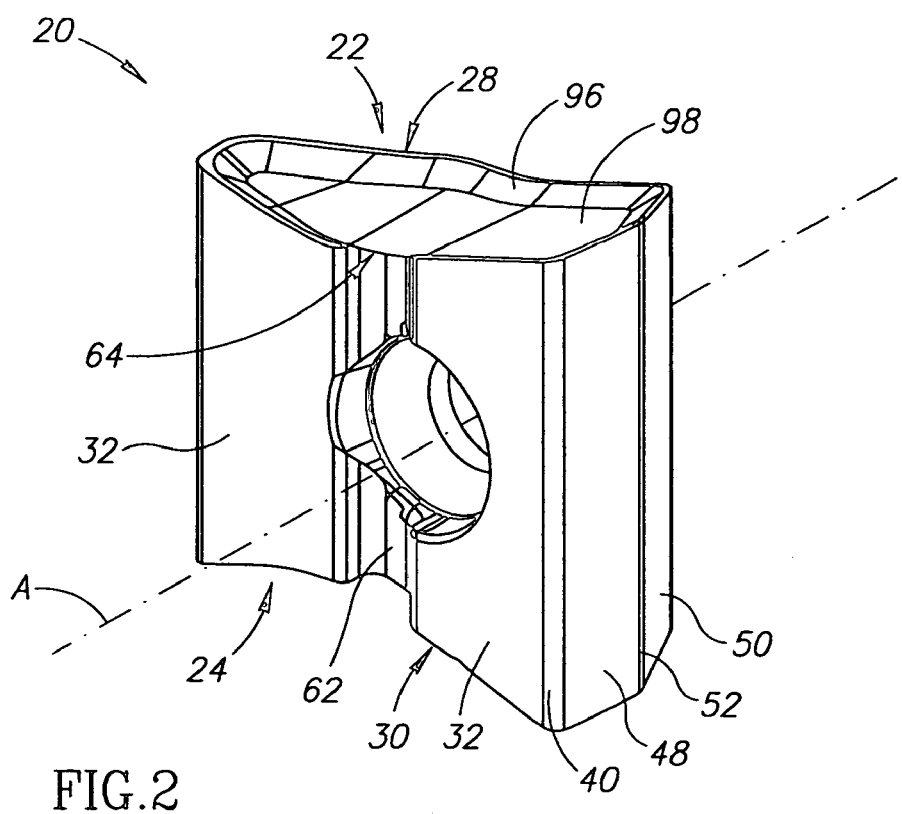
FIG. 2 is another perspective view of the cutting insert shown in FIG. 1.

Attention is drawn to FIGS. 1 to 7 of the drawings showing a double-sided tangential cutting insert 20 in accordance with the present invention. The cutting insert 20 is typically made of extremely hard and wear-resistant material such as cemented carbide, either by form-pressing and sintering carbide powders in a binder or by powder injection molding methods. The cutting insert 20 comprises identical opposing end surfaces 22, 24 and a peripheral side surface 26 extending between the end surfaces 22, 24. A median plane M divides the cutting insert 20 into two equal halves, with the two end surfaces 22, 24 located on opposite sides of the median plane M. The cutting insert 20 possesses mirror (or reflection) symmetry about the median plane M. During a cutting operation, only one of the end surfaces 22, referred to as the operative end surface 22, participates in the cutting operation. Since the two end surfaces 22, 24 are identical, only one of them, namely the operative end surface 22, will be described in detail (the opposing end surface will be referred to as the non-operative end surface 24).

The peripheral side surface 26 intersects the end surfaces 22, 24 at peripheral edges 28, 30. The peripheral side surface 26 comprises first and second, generally planar and parallel, opposing major side surfaces 32, 34 and first and second opposing minor side surfaces 36, 38 extending between the major side surfaces 32, 34. Adjacent major and minor side surfaces merge at common corner side surfaces. The first major side surface 32 merges with the first minor side surface 36 at a first corner side surface 40. The first minor side surface 36 merges with the second major side surface 34 at a second corner side surface 42. The second major side surface 34 merges with the second minor side surface 38 at a third corner side surface 44 and the second minor side surface 38 merges with the first major side surface 32 at a fourth corner side surface 46. Each minor side surface is divided into two component minor side surfaces. The first minor side surface 36 comprises first and second component first minor side surfaces 48, 50 merging at a first component corner side surface 52. The second minor side surface 38 comprises first and second component second minor side surfaces 54, 56 merging at a second component corner side surface 58. The first component first minor side surface 48 and the first component second minor side surface 54 are adjacent the first major side surface 32, whereas the second component first minor side surface 50 and the second component second minor side surface 56 are adjacent the second major side surface 34.

A through bore 60, having an axis A which lies in the median plane M, passes through the peripheral side surface 26, extending between the first and second major side surfaces 32, 34. A groove 62 in the peripheral side surface 26 extends between the opposing end surfaces 22, 24. The groove 62, which is intersected by the through bore 60, is straight and perpendicular to the median plane M of the cutting insert 20.

The peripheral edge 28 comprises two component edges, a secondary edge 64 and a primary edge 66. The secondary edge 64 is formed at the intersection of the groove 62 and the operative end surface 22, and the primary edge 66 is the whole of the peripheral edge 28 apart from the secondary edge 64. The primary edge 66 comprises first and second major edges 68, 70, formed at the intersection of the first and second major side surfaces 32, 34 with the operative end surface 22, respectively; first and second minor edges 72, 74, formed at the intersection of the first and second minor side surfaces 36, 38 with the operative end surface 22, respectively; and first, second, third and fourth corner edges 76, 78, 80, 82, formed at the intersection of the first, second, third and fourth corner side surfaces 40, 42, 44, 46 with the operative end surface 22, respectively. The first minor edge 72 comprises a first component first minor edge 84, a second component first minor edge 86 and a first component corner edge 88, formed at the intersection of the first component first minor side surface 48, the second component first minor side surface 50 and the first component corner side surface 52 with the operative end surface 22, respectively. Similarly, the second minor edge 74 comprises a first component second minor edge 90, a second component second minor edge 92 and a second component corner edge 94, formed at the intersection of the first component second minor side surface 54, the second component second minor side surface 56 and the second component corner side surface 58 with the operative end surface 22, respectively.

The operative end surface 22 comprises a peripheral surface portion 96 sloping inwardly from the peripheral edge 28 towards the median plane M and merging with a central surface portion 98 of the operative end surface 22. The peripheral edge 28 forms a cutting edge and the peripheral surface portion 96 forms an associated chip rake surface. Consequently, any section of the peripheral edge 28 forms a cutting edge and therefore any such section will be referred to herein either as an edge or a cutting edge.

Figure 6:
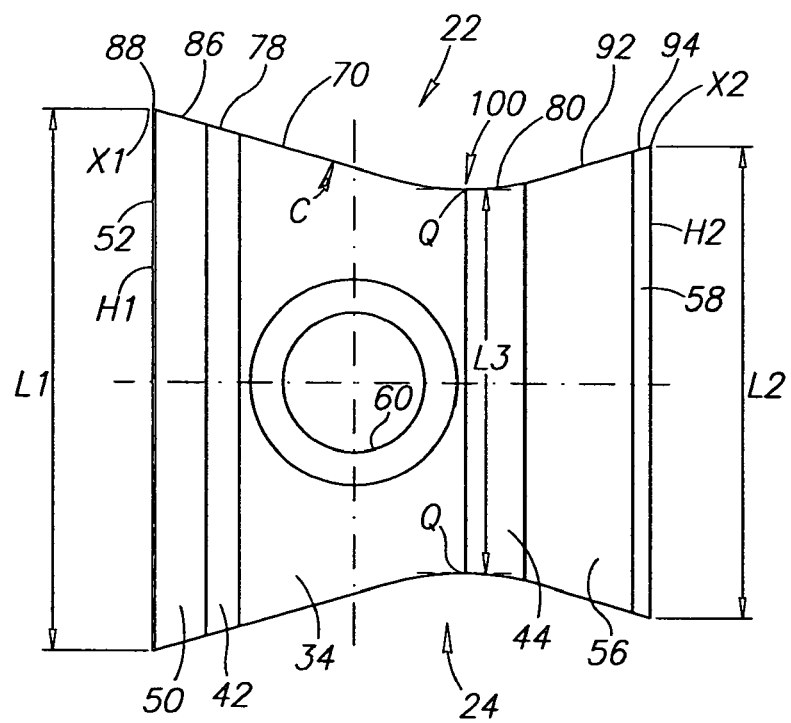
FIG. 6 is a side view of the cutting insert shown in FIG. 1 taken in the direction VI as shown in FIG. 3.

With reference to FIG. 6, it is noted that in a side view of the cutting insert 20 taken perpendicular to the second major side surface 34, also referred to herein as a first side view of the cutting insert 20, the second component first minor edge 86, the second corner edge 78, the second major edge 70, the third corner edge 80, the second component second minor edge 92 and the second component corner edge 94 form a generally concave edge portion C of the peripheral edge 28. In other words, in the first side view the peripheral edge 28 is generally concave. The structure of this generally concave edge portion C is as follows. The second component first minor edge 86 extends from the first component corner edge 88 sloping towards the median plane M and merges with the second corner edge 78. The second corner edge 78 extends from the second component first minor edge 86 sloping towards the median plane and merges with the second major edge 70. The second major edge 70 extends from the second corner edge 78 sloping towards the median plane M and merges with the third corner edge 80 at a region of join 100. The region of join 100 contains a point Q which is the point on the concave edge portion C closest to the median plane M, also referred to as the minimum point Q, with respect to the median plane M. Around the region of join 100, the peripheral edge 28 is parallel to the median plane M. The third corner edge 80 extends from the region of join 100 sloping away from the median plane M and merges with the second component second minor edge 92. The second component second minor edge 92 extends from the third corner edge 80 sloping away from the median plane M and merges with the second component corner edge 94. In the first side view, the first and second component corner edges 88, 94 form first and second end points X1, X2 of the generally concave edge portion C, with the second end point X2 being closer to the median plane M than the first end point X1.

In the first side view, the cutting insert 20 is bounded by the first component corner side surface 52 on one side and the second component corner side surface 58 on the other side, the first and second component corner side surfaces 52, 58 thereby defining first and second bounding lines H1, H2 of the cutting insert 20. The minimum point Q on the generally concave edge portion C of the peripheral edge 28 is closer to the second bounding line H2 than to the first bounding line H1. Therefore, in the first side view, the generally concave edge portion C is non-symmetric about the minimum point Q. It is also seen that in the side view of the cutting insert 20 taken perpendicular to the second major side surface 34, the cutting insert 20 has three characteristic lengths measured between the peripheral edges 28 of the opposing end surfaces 22. A maximum length L1, measured between the first component corner edges 88 (therefore L1 defines a maximum length of the first minor side surface 36), an intermediate length L2 measured between the second component corner edges 94 (therefore L2 defines a maximum length of the second minor side surface 38) and a minimum length L3, measured between the minimum points Q on the peripheral edges 28. Clearly, the maximum length L1 is greater than the intermediate length L2 which in turn is greater than the minimum length L3. The difference in lengths between the first and second minor side surface 36, 38, can also be clearly seen in FIG. 5 where, due to the fact that the maximum length of the second minor side surface 38 is smaller than the maximum length of the first minor side surface 36, portions of both the operative end surface 22 and the opposing non-operative end surface 24 can be seen.

Figure 7:
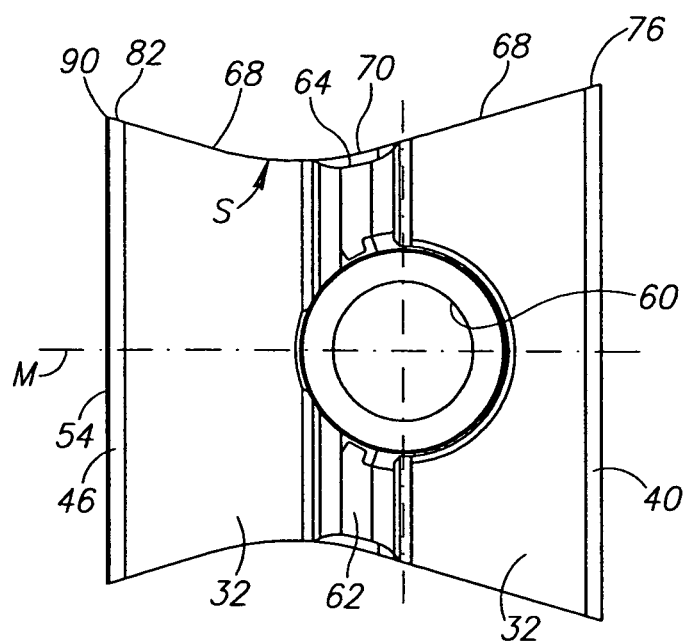
FIG. 7 is a side view of the cutting insert shown in FIG. 1 taken in the direction VII as shown in FIG. 3.

With reference to FIG. 7, it is noted that in a side view of the cutting insert 20 taken perpendicular to the first major side surface 32, also referred to herein as a second side view of the cutting insert 20, the fourth corner edge 82, the first major edge 68, the secondary edge 64 and the first corner edge 76 form a generally concave edge portion S of the peripheral edge 28. In other words, in the second side view the peripheral edge 28 is generally concave. When comparing the generally concave edge portion S of the peripheral edge 28 in the second side view with the generally concave edge portion C of the peripheral edge 28 in the first side view it is noted that the former is slightly recessed at a central region thereof, the recess being formed by the secondary edge 64.

Figure 3:
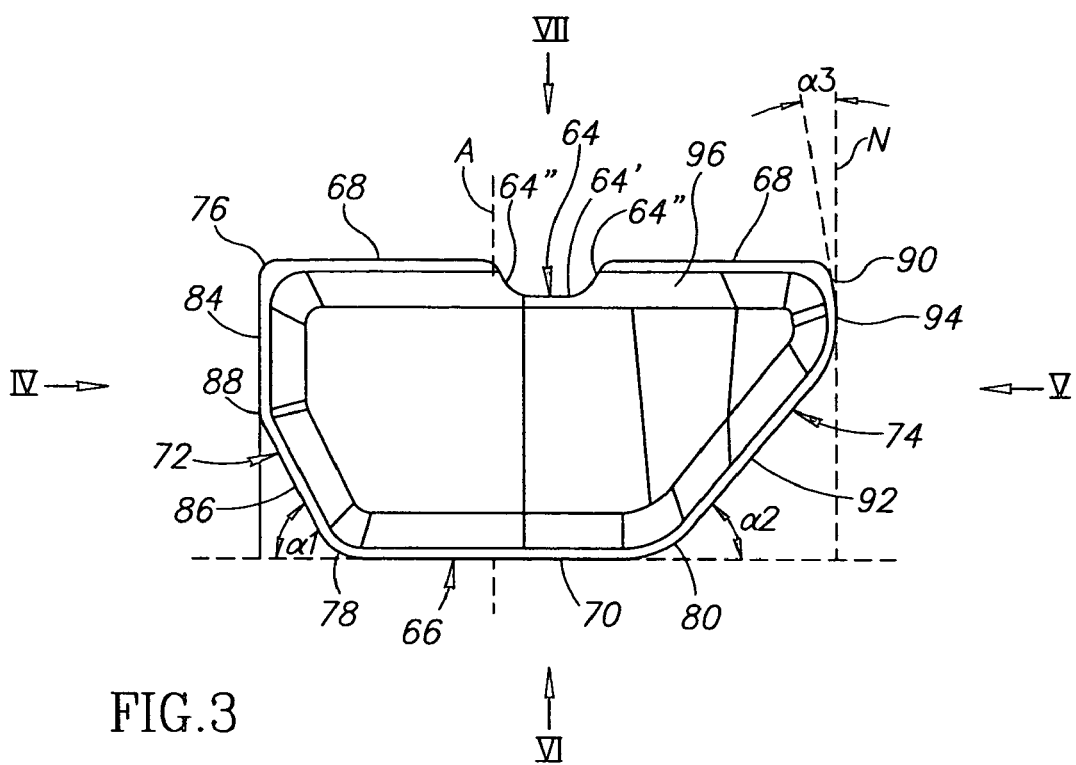
FIG. 3 is an end view of the cutting insert shown in FIG. 1.

With reference to FIG. 3, it can be seen that in an end view of the cutting insert 20, the second component first minor edge 86 makes a first angle α1 with the second major edge 70 and the second component second minor edge 92 makes a second angle α2 with the second major edge 70. The first component second minor edge 90 makes a third angle α3 with a line N normal to a continuation line of the second major edge 70 and the first component first minor edge 84 is perpendicular to the continuation line of the second major edge 70. The secondary edge 64 comprises three component edges, an inner secondary edge 64' and two outer secondary edges 64" extending from either end of the inner secondary edge 64' to the first major edge 68, with each outer secondary edge 64" making an obtuse angle with the inner secondary edge 64'. The first major edge 68, comprises two straight line portions, interrupted by the groove 62, parallel to the second major edge 70, in the end view.

Figure 4:
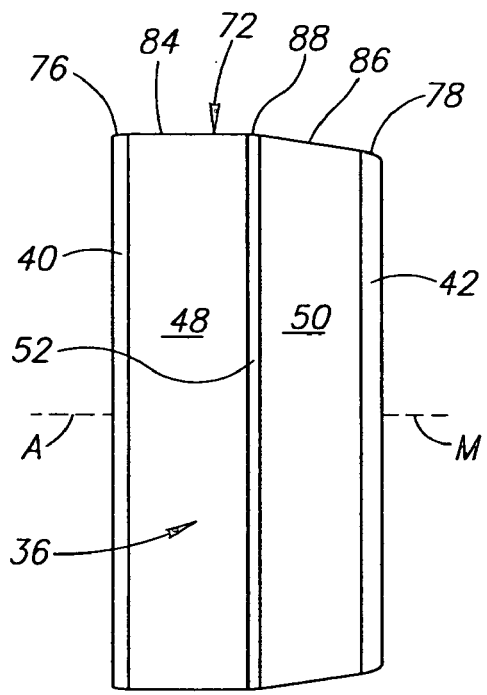
FIG. 4 is a side view of the cutting insert shown in FIG. 1 taken in the direction IV as shown in FIG. 3.
Figure 5:
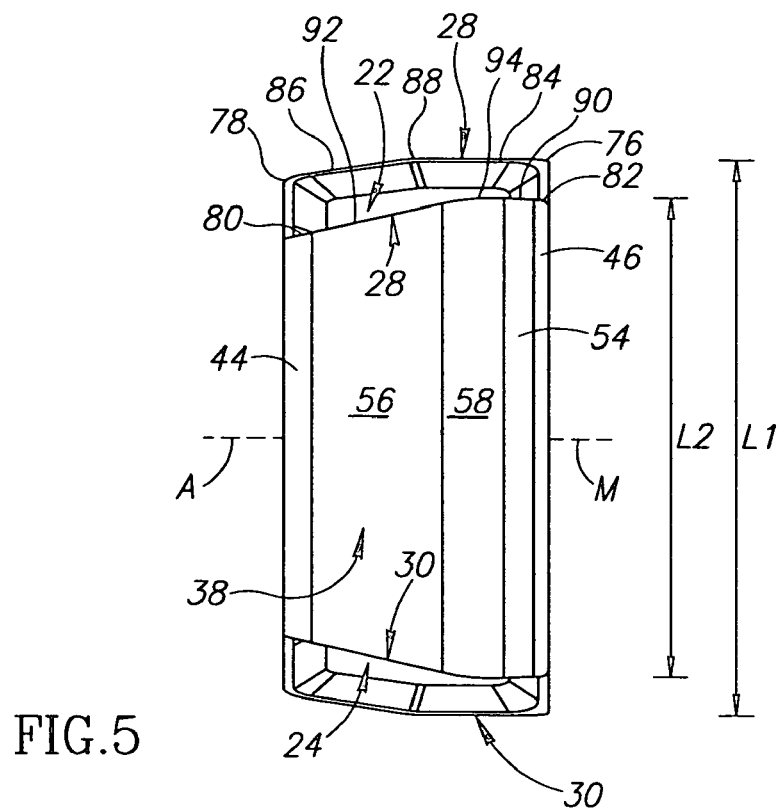
FIG. 5 is a side view of the cutting insert shown in FIG. 1 taken in the direction V as shown in FIG. 3.

With reference to FIG. 4, it is noted that in a third side view of the cutting insert 20, the second component first minor edge 86 extends from the second corner edge 78 to the first component corner edge 88 sloping away from the median plane M. Similarly, with reference to FIG. 5, it is noted that in a fourth side view of the cutting insert 20, the second component second minor edge 92 extends from the third corner edge 80 to the second component corner edge 94 sloping away from the median plane M. As can be seen in the figures, the through bore 60 can be seen in the first and second side views but not in the third and fourth side views.

Figure 8:
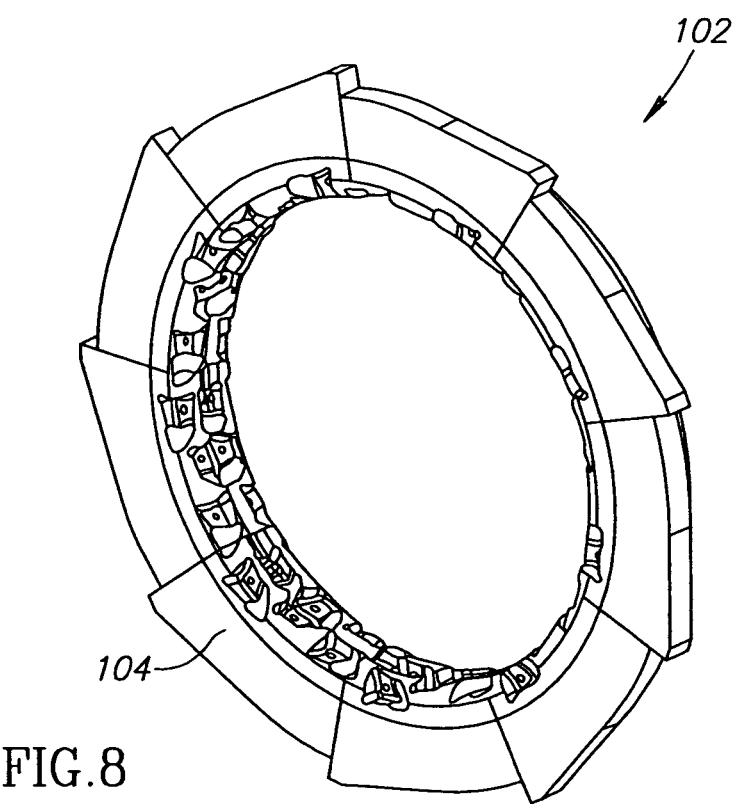
FIG. 8 is a perspective view of a milling cutter in accordance with the present invention.
Figure 9:
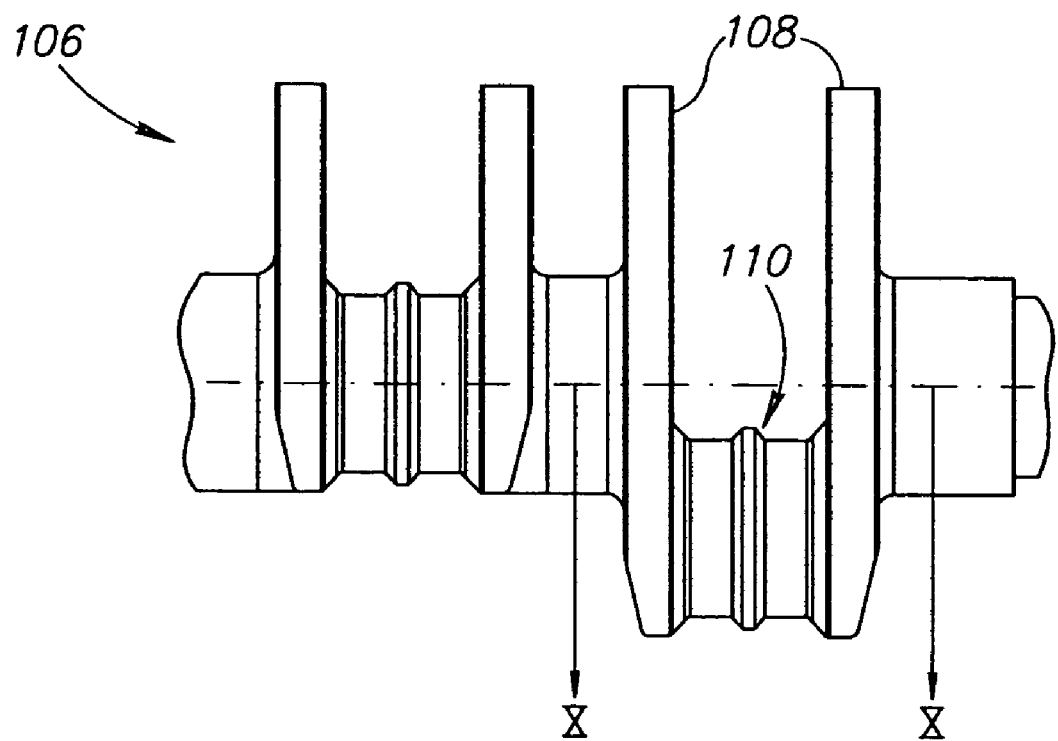
FIG. 9 is a partial side view of a crankshaft milled with the milling cutter shown in FIG. 8.
Figure 10:
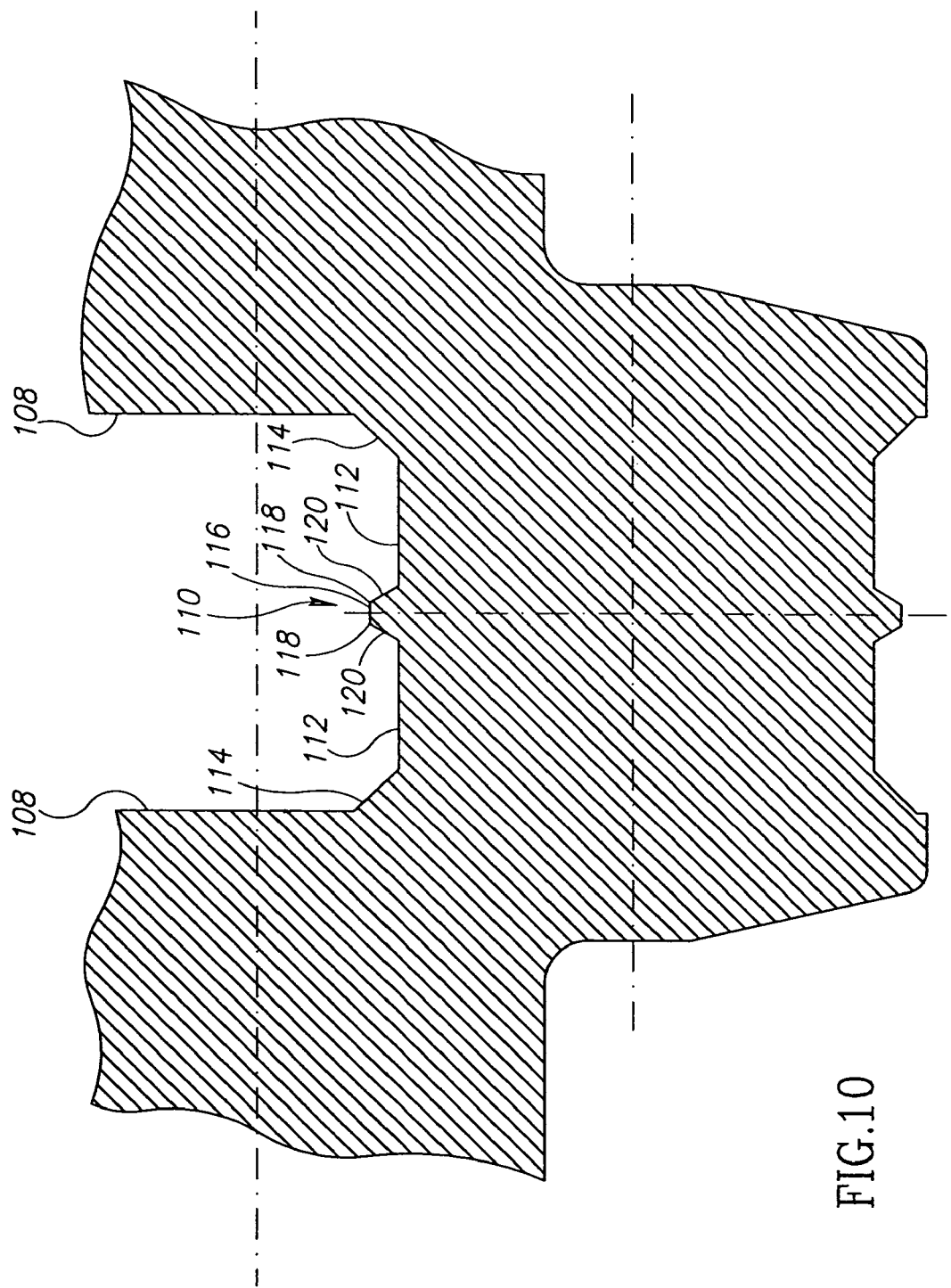
FIG. 10 is a cross section of the crankshaft shown in FIG. 9, taken along the line XX.

As will be described herein below with reference to FIGS. 8 to 14, the above described geometrical properties of the cutting insert 20 enable it to mill all the features of a complex profile for which it is designed. FIG. 8 shows an annular internal milling cutter 102 comprising nine segments 104, each segment 104 having seven cutting inserts 20 secured thereto. FIG. 9 shows a section of a crankshaft 106 after being milled by the milling cutter 102 and FIG. 10 shows in cross section the features milled. These features are the cheeks 108, mini-cheek 110 midway between the cheeks 108, two 90° sections 112 (that is, at 90° to the cheeks 108) between the mini-cheek 110 and the cheeks 108 and two 45° sections 114 adjacent the cheeks 108 and the 90° sections 112. The mini-cheek 110 comprises an upper straight section 116 that merges with two corner sections 118 and two 30° sections 120 (that is, at 30° to the cheeks 108) extending from the corner sections to the 90° section 112.

Figure 11:
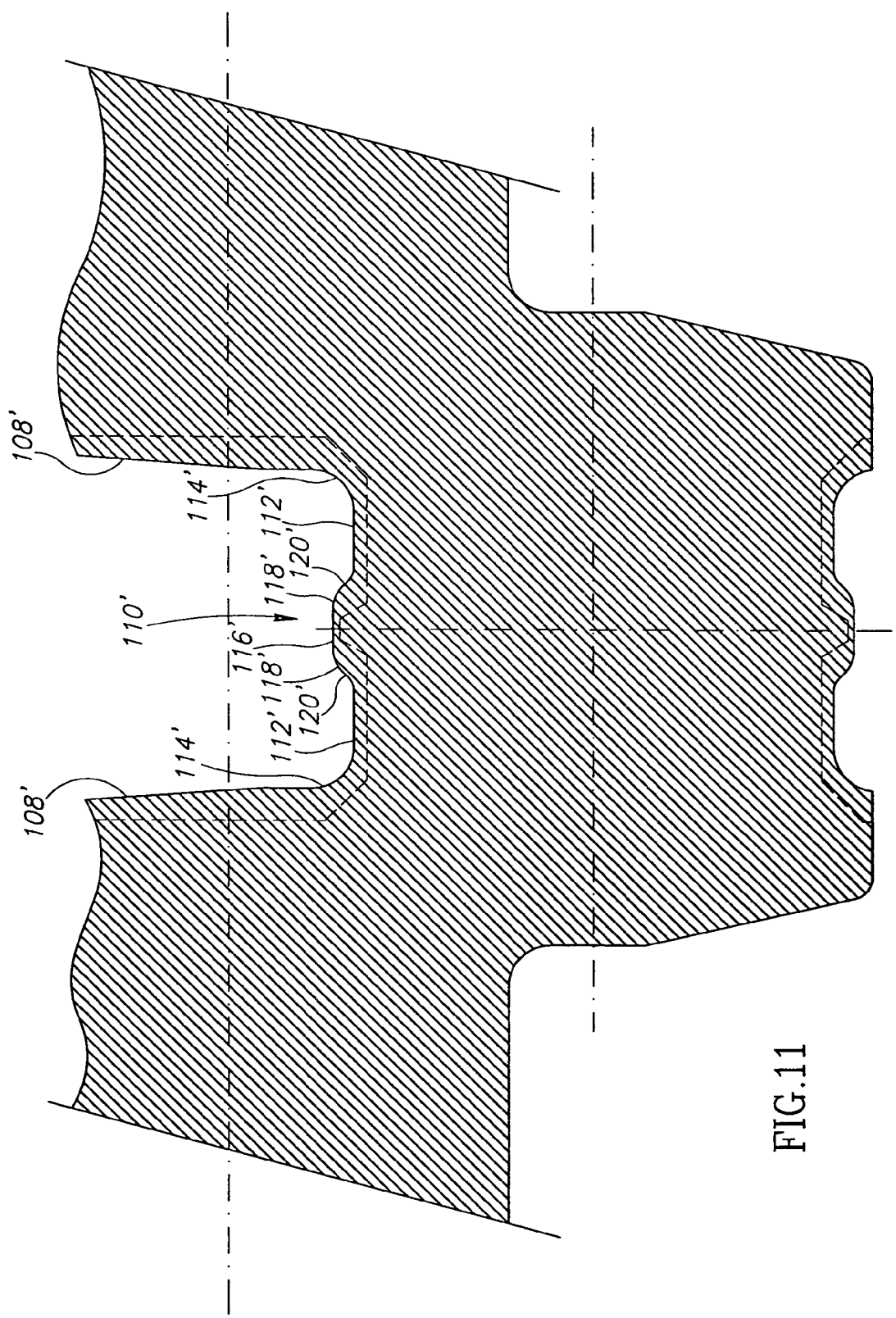
FIG. 11 is a cross section similar to that shown in FIG. 19 before the crankshaft is milled.

FIG. 11 shows a cross section of the crankshaft 106 similar to that shown in FIG. 10, but before the crankshaft 106 is milled. The continuous line represents the above-mentioned features before the crankshaft 106 is milled and the dashed line adjacent the continuous line shows the milled surface as in FIG. 10. The pre-milled features being, pre-milled cheeks 108', pre-milled mini-cheek 110 (pre-milled upper section 116', pre-milled corner sections 118, pre-milled 30° sections 120') pre-milled 90° sections 112' and pre-milled two 45° sections 114'. It will be appreciated by those skilled in the art that the crankshaft 106, as well as crankshafts in general, are milled in a number of stages. The milling process as described herein and as illustrated in FIG. 11, represents only one intermediate stage of a number of stages required in order to fully mill the crankshaft 106.

Figure 12:
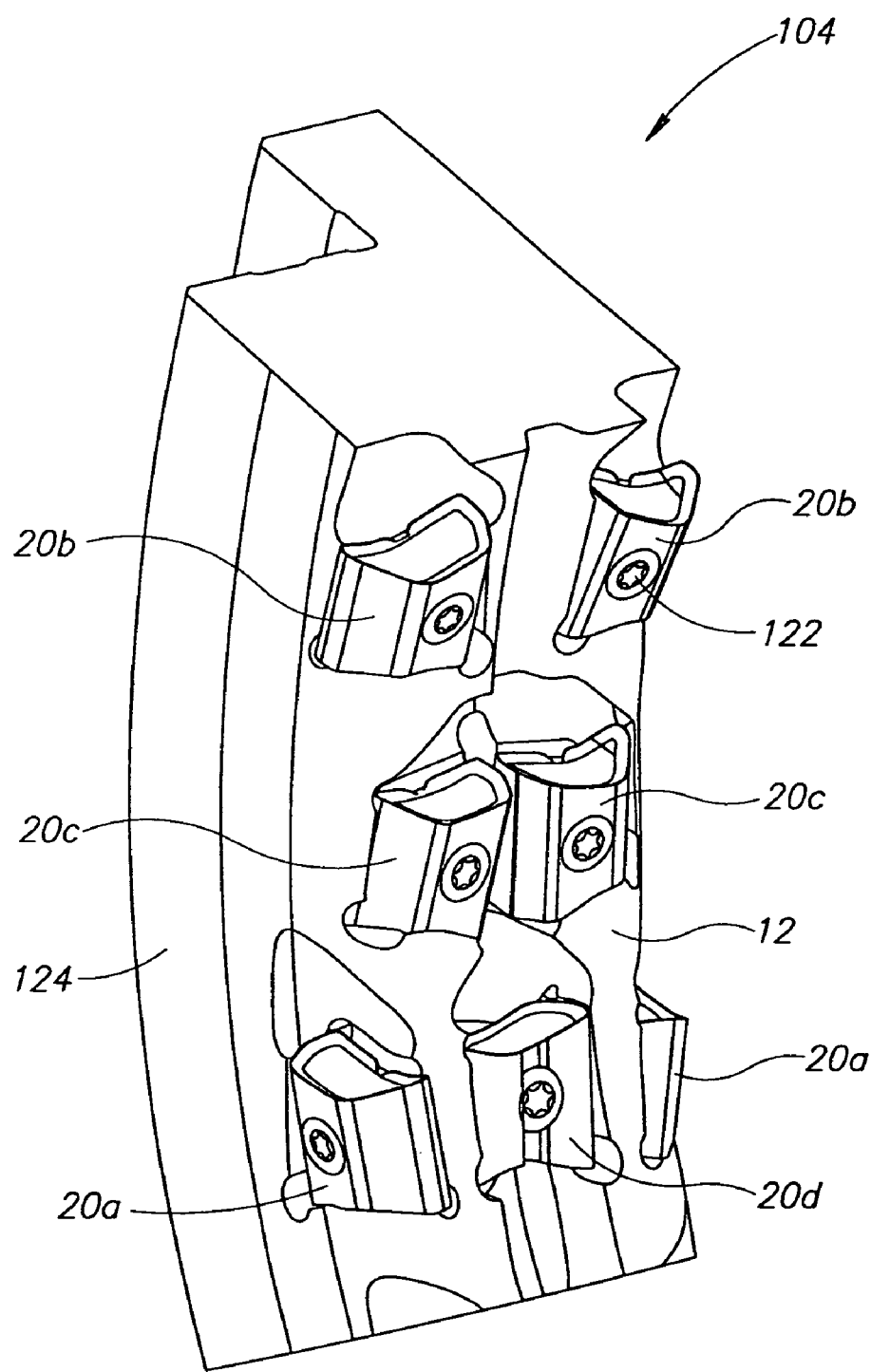
FIG. 12 is a perspective view of a segment of the milling cutter shown in FIG. 8.
Figure 14:
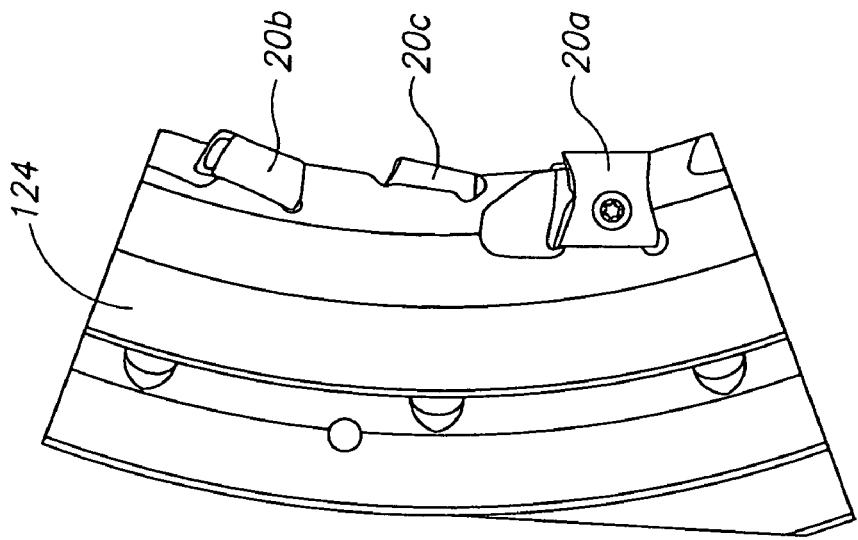
FIG. 14 is a side view of the segment shown in FIG. 8.
Figure 13:
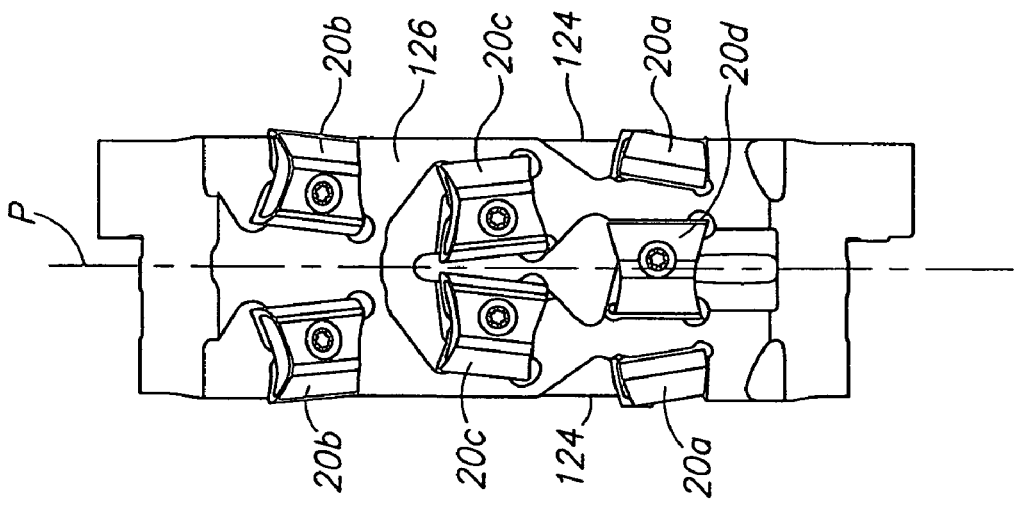
FIG. 13 is an end on view of the segment shown in FIG. 8.

Attention is now drawn to FIGS. 12 to 14 showing one segment 104. The segment 104 has seven cutting inserts 20 secured to it by means of clamping screws 122 and arranged in three pairs of cutting inserts and a single unpaired cutting insert. A first pair comprises two extreme outer cutting inserts 20a located on opposing side faces 124 of the segment 104. A second pair comprises two outer cutting inserts 20b located on the inner face 126 of the segment 104 with one of the outer cutting inserts 20b adjacent one side face 124 and the other outer cutting insert 20b adjacent the opposing side face 124. A third pair comprises two inner cutting inserts 20c located adjacent a median plane P of the segment 104 on either side thereof. The single unpaired cutting insert is a central cutting insert 20d located substantially midway between the two side faces 124. The central cutting insert 20d is secured to the segment 104 with its groove 62 facing away from the segment 104, whereas each of the extreme outer cutting inserts 20a, the outer cutting inserts 20b and the inner cutting inserts 20c is secured to the segment 104 with its groove 62 facing towards the segment 104.

When milling the crankshaft 106, the cutting inserts 20a, 20b, 20c, 20d of each segment 104 operate on given sections of the crankshaft 106. The two extreme outer cutting inserts 20a mill the cheeks 108', the 45° sections 114' and a portion of the 90° section 112' adjacent the 45° section 112'. The two outer cutting inserts 20b mill the 45° sections and a portion of the 90° section 112' adjacent the 45° section 114' extending to approximately half way along the 90° section. The two inner cutting inserts 20c mill the 30° sections 120' and a portion of the 90° section 112' adjacent the 30° section 120' extending to approximately half way along the 90° section, and the central cutting insert 20d mills the upper section 116 and the corner sections 118 of the mini-cheek 110. It will be appreciated that the way in which the cutting edges slope relative to the median plane M provides them with an inherent positive axial rake, thereby making the cutting process more efficient.

Although the present invention has been described to a certain degree of particularity, it should be understood that various alterations and modifications could be made without departing from the spirit or scope of the invention as hereinafter claimed.

What is claimed is:

1. A tangential cutting insert comprising:
   first and second opposing end surfaces and a peripheral side surface extending therebetween;
   first and second peripheral edges, respectively, formed at the intersection of the first and second end surfaces with the peripheral side surface, at least a section of the first peripheral edge forming a major cutting edge;
   at least one groove in the peripheral side surface extending between and intersecting the first and second end surfaces at said first and second peripheral edges, respectively;
   wherein, in first and second opposing side views of the cutting insert, at least the first peripheral edge is generally concave; and
   wherein, in an end view of the cutting insert, the major cutting edge comprises two straight line portions interrupted by the at least one groove.

2. The tangential cutting insert according to claim 1, wherein in the first and second opposing side views, the first peripheral edge extends between first and second end points thereof, the second end point being closer to a median plane of the cutting insert than the first end point.

3. The tangential cutting insert according to claim 2, wherein in the first side view, a minimum point exists on the first peripheral edge, the minimum point being closer to the median plane of the cutting insert than any other point on the at least the first peripheral edge and also being closer to one end point than the other.

4. The tangential cutting insert according to claim 3, wherein the cutting insert is provided with a through bore passing through the peripheral side surface.

5. The tangential cutting insert according to claim 4, wherein the through bore has an axis contained in the median plane of the cutting insert.

6. The tangential cutting insert according to claim 1, wherein the at least one groove intersects the first and second end surfaces at secondary edges of respective first and second first peripheral edges.

7. A milling cutter comprising an annular cutter body having a plurality of identical segments equally spaced about an inner circumference of the cutter body, each segment having seven cutting inserts secured thereto, wherein each cutting insert comprises:
   first and second opposing end surfaces and a peripheral side surface extending therebetween;
   first and second peripheral edges, respectively, formed at the intersection of the first and second end surfaces with the peripheral side surface, at least a section of the first peripheral edge forming a major cutting edge;
   at least one groove in the peripheral side surface extending between and intersecting the first and second end surfaces at said first and second peripheral edges, respectively;
   wherein, in first and second opposing side views of said each cutting insert, at least the first peripheral edge is generally concave; and
   wherein, in an end view of said each cutting insert, the major cutting edge comprises two straight line portions interrupted by the at least one groove.

8. The milling cutter according to claim 7, wherein the seven cutting inserts on each segment are arranged as three pairs and a single unpaired cutting insert.

9. The milling cutter according to claim 8, wherein in a first of the three pairs the cutting inserts are located on opposing side faces of the segment; in a second of the three pairs the cutting inserts are located on the inner face of the segment with one of the cutting inserts adjacent one side face of the segment and the other cutting insert adjacent the opposing side face of the segment; in a third of the three pairs, the cutting inserts are located adjacent a median plane of the segment on either side thereof; and the single unpaired cutting insert is located substantially midway between the two side faces of the segment.

10. The milling cutter according to claim 9, wherein the single unpaired cutting insert is secured to the segment with its groove facing away from the segment, whereas each of the cutting inserts of the three pairs of cutting inserts is secured to the segment with its groove facing towards the segment.

11. The milling cutter according to claim 7, wherein for each cutting insert, in the first and second opposing side views, the first peripheral edge extends between first and second end points thereof, the second end point being closer to a median plane of the cutting insert than the first end point.

12. The milling cutter according to claim 11, wherein for each cutting insert, in the first side view, a minimum point exists on the first peripheral edge, the minimum point being closer to the median plane of the cutting insert than any other point on the at least the first peripheral edge and also being closer to one end point than the other.

13. The milling cutter according to claim 12, wherein each cutting insert is provided with a through bore passing through the peripheral side surface.

14. The milling cutter according to claim 13, wherein in each cutting insert, the through bore has an axis contained in the median plane of the cutting insert.

15. The milling cutter according to claim 7, wherein in each cutting insert, the at least one groove intersects the first and second end surfaces at secondary edges of respective first and second first peripheral edges.

* * * * *